April 12, 1932.                D. L. ANDEREGG                1,854,093
                              CATTLE GUARD GATE
                         Filed Sept. 12, 1930        2 Sheets-Sheet 1

DAN L. ANDEREGG INVENTOR

Patented Apr. 12, 1932

1,854,093

UNITED STATES PATENT OFFICE

DAN L. ANDEREGG, OF FREDERICKSBURG, TEXAS

CATTLE GUARD GATE

Application filed September 12, 1930. Serial No. 481,546.

This invention relates to improvements in gate construction primarily designed for use in stock yards and in cattle country to obviate access of cattle thereto but to permit vehicles to pass without restriction.

Another object of the invention consists of retaining elements for the gate yieldably inducing the gate to occupy a closed position.

More specifically stated the gate construction is provided with a flooring of a type designed to permit passage of vehicular traffic thereover but to prevent access thereto by live stock whereby the gate, although operable by pressure exercised thereagainst by vehicles, will be adequate for the purpose of keeping the live stock corralled.

With the above and other objects in view, the invention further consists of the following novel features and details of construction, to be hereinafter more fully described, illustrated in the accompanying drawings and pointed out in the appended claim.

In the drawings:—

Figure 1:
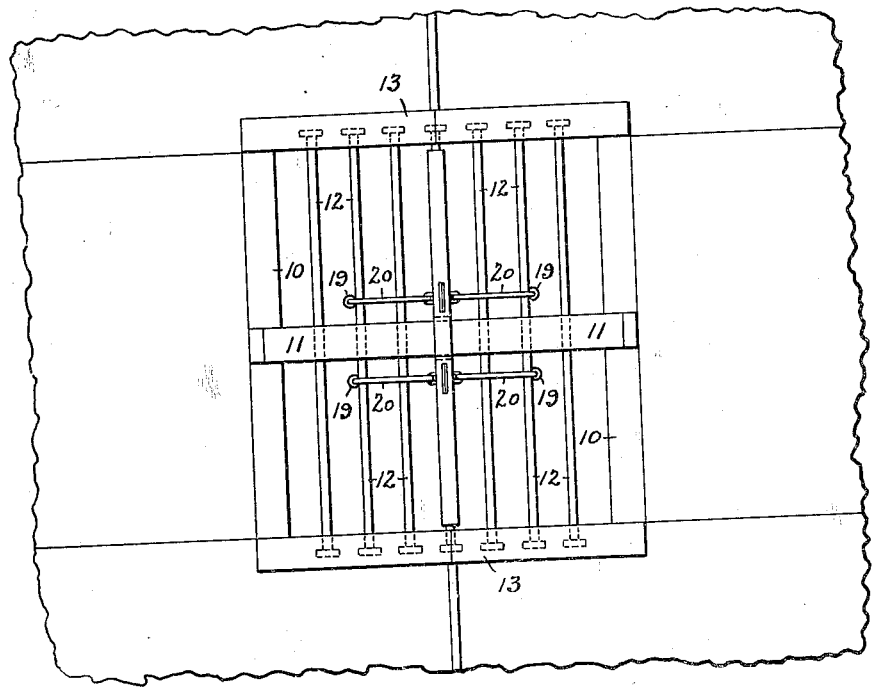
Figure 1 is a top plan view of the present invention.

Referring to the drawings in detail wherein like characters of reference denote corresponding parts, the reference character 10 indicates generally a pit or boxing subdivided into multiple compartments by a partition 11. The side walls of the pit and the partition 11 in alignment with that of the ground or road surface approaching the gate opening are designed to support spaced longitudinally disposed tread members 12 to support the wheels of vehicles and the like.

Figure 3:
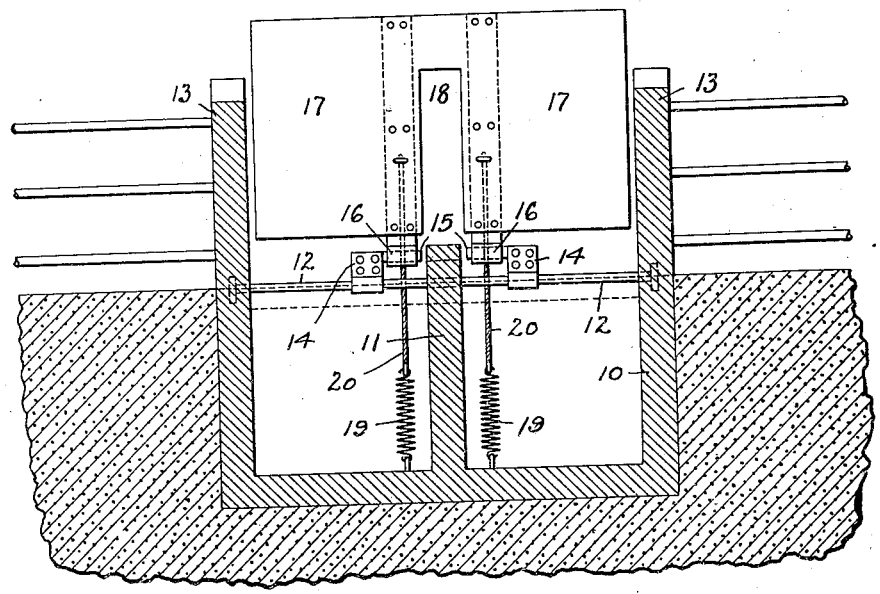
Figure 3 is a vertical sectional view taken on line 3—3 of Figure 2.

Wall members 13, carried by and upstanding from the side portions of the pit for appreciable distances therefrom, namely equivalent to that of the height of the fence posts, not shown, from the ground surface, have secured thereto the terminals of the form of fencing employed in the manner suggested in Figures 1 and 3 of the drawings. Being that the tread members 12 are disposed in alignment with that of the fencing and are of circular shape in cross section and spaced for appreciable distances apart, it is to be noted that live stock will be unable to approach the gate to open same after the manner of vehicles, in a way about to be described.

Figure 2:
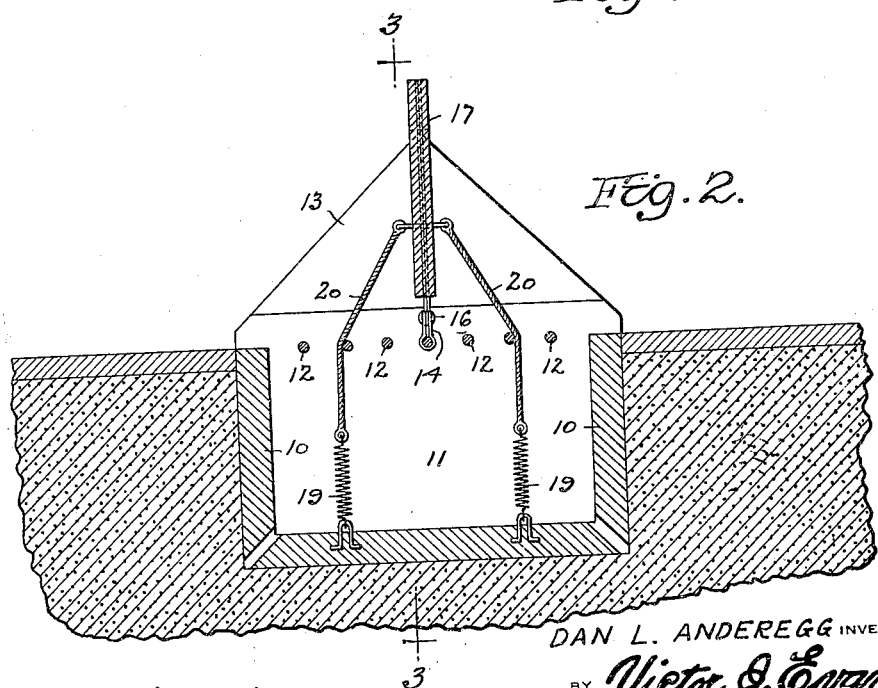
Figure 2 is a horizontal sectional view taken therethrough.

Clamping members 14 carried upon those portions of the intermediate tread member upon opposite sides of the partition 11, are provided with inwardly projected horizontally disposed trunnions 15, receivable within bearing sleeves 16 conveniently located upon the gate 17. The gate is provided with a cutout portion or slot 18 to facilitate accommodation of the upwardy protruding portion of the partition 11 when the gate is shifted to occupy the position illustrated in Figure 4. Spring elements 19, suitably anchored within the bottoms of each of the compartments in the pit, are connected at their opposite ends with flexible elements 20, swivelly associated with the gate upon diametrically opposite sides thereof to exercise equal degrees of spring tension thereagainst whereby the gate will be normally disposed in the Figure 2 position.

Figure 4:
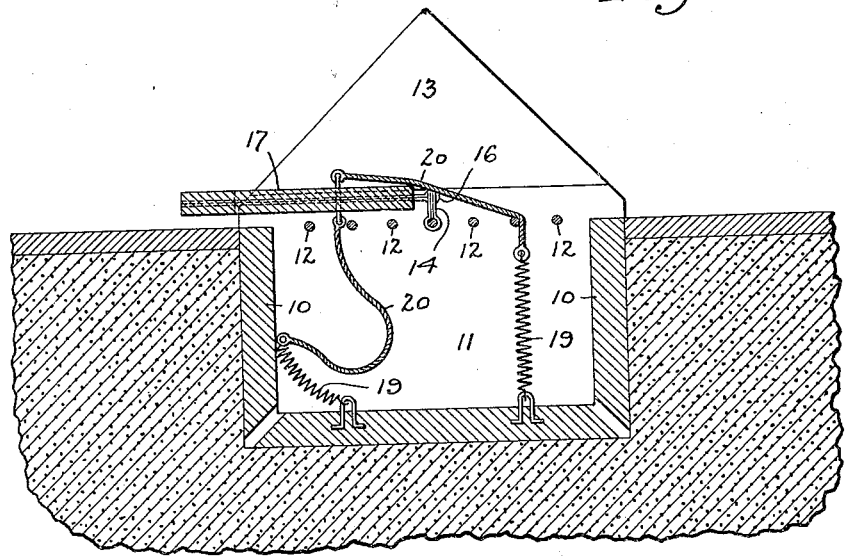
Figure 4 is a view similar to Figure 2 showing the gate disposed in position to allow vehicles to pass through the gate opening.

Although the spring elements 19 may be only strong enough to yieldingly maintain the gate 17 in an upright position, under ordinary circumstances, it will be noted that the bumper and wheels of vehicles, upon engaging the gate, may easily dispose the latter, as suggested in Figure 4 of the drawings whereby the vehicle may be allowed to pass through the gate and the latter will be automatically shifted to occupy a neutral position when the rear tires of the vehicle leave the gate.

In contradistinction to several other types of cattle guard gates built along similar lines having closely associated treads with pointed, beveled or spiked surfaces, it is to be noted that in the present invention the treads are round and spaced sufficiently apart to permit the animal's leg to pass therebetween rather than wedge therebetween whereby cattle, making an effort to escape through the gate, will not be injured in the attempt.

The invention is susceptible of various changes in its forms, proportion and minor details of construction and the right is herein reserved to make such changes as properly fall within the scope of the appended claim.

Having described the invention, what is claimed is:—

A cattle guard comprising a pit box having a partition wall across the interior and between the side walls thereof, a series of spaced rods passing through the partition wall and ends anchored in the end walls of the pit box, clamp members mounted upon the intermediate rod of the series of rods and having trunnions disposed toward the partition wall and at opposite sides thereof, sleeves journaled upon said trunnions, a gate fixed to the sleeves and having a medially located slot adapted to receive the partition wall when the gate is swung down, flexible elements attached to the sides of the gate and extending through the spaces of and between certain of the rods, springs attached to the flexible elements and housed in the box and means for anchoring the springs to the bottom of the box.

In testimony whereof I affix my signature.

DAN L. ANDEREGG.